Dec. 3, 1963 J. W. ULLGER 3,112,858

PHONOGRAPH RECORD SLEEVE

Filed May 24, 1962

INVENTOR.
JOSEPH W. ULLGER

BY Arthur H Seidel

ATTORNEY

United States Patent Office 3,112,858

Patented Dec. 3, 1963

3,112,858
PHONOGRAPH RECORD SLEEVE

Joseph W. Ullger, Philadelphia, Pa., assignor to Boas Box Company, Philadelphia, Pa., a corporation of Pennsylvania Filed May 24, 1962, Ser. No. 197,473
4 Claims. (Cl. 229—68)

In general, this invention relates to a new and different phonograph record sleeve and more particularly to a phonograph record sleeve foldable from a single sheet of cardboard which is capable of firmly grasping a record placed therein.

Heretofore it has been known to have phonograph record sleeves which were made of a single sheet of foldable cardboard material. However, as one end of the sleeve was normally opened, the record had a tendency to slide out inadvertently, marring the finish of the record. To simply put a flap over the open end would not prevent sliding of the record within the sleeve causing scratches on the record grooves.

It is the general object of this invention to avoid and overcome the foregoing and other difficulties of and objections to the prior art practices by the provision of a better and less expensive phonograph record sleeve.

Another object is to provide a new and novel phonograph record sleeve capable of holding a record firmly in place.

Another object of this invention is to provide a more simple phonograph record sleeve manufactured from a one-piece blank which is capable of holding a record in the sleeve from side to side movement.

Another object is to provide a new and better phonograph record sleeve having one side open which will securely retain a record in place.

Other objects will appear hereinafter.

For the purpose of illustrating the invention there is shown in the drawings a form which is presently preferred; it being understood, however, that this invention is not limited to the precise arrangements and instrumentalities shown.

Figures 1, 2, 3, 4:
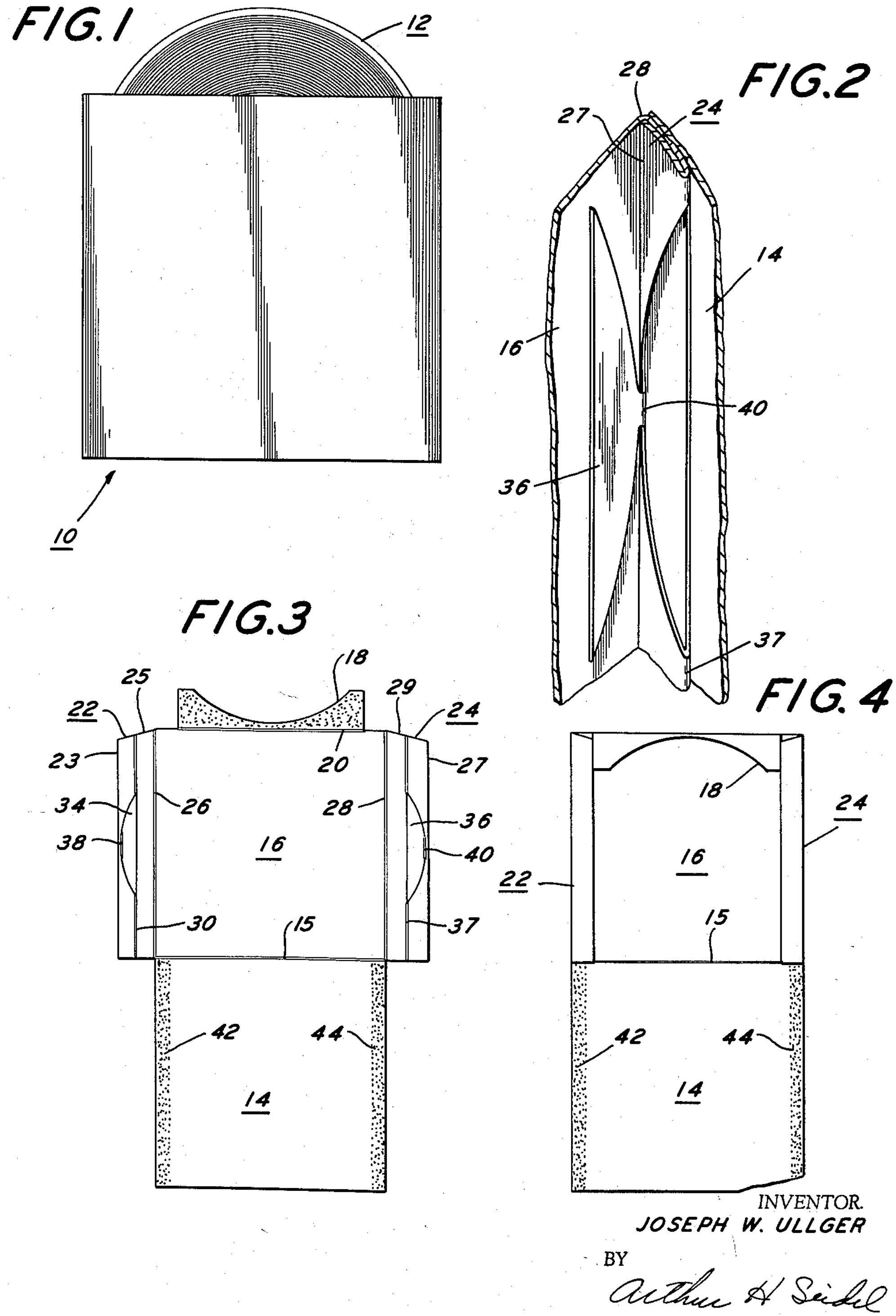
FIGURE 1 is a front view of the phonograph record sleeve of the present invention with a record being inserted therein.
FIGURE 2 is a fragmentary isometric view of one side of the phonograph record sleeve of the present invention with the walls moved apart for clarity.
FIGURE 3 is a showing of a one-piece blank which might be utilized in manufacturing the phonograph record sleeve of the present invention.
FIGURE 4 is the one-piece blank of FIGURE 3 partially assembled in the process of manufacturing the phonograph record sleeve of FIGURE 1.

The phonograph record sleeve of the present invention has been generally designated as 10. In FIGURE 1 a record 12 is shown partially inserted in the sleeve 10.

The sleeve 10 consists of a front wall 14 and a back wall 16 folded along a bottom fold line 15. The left side of the sleeve end is shown in isometric in FIGURE 2. For clarity, the front wall 14 and back wall 16 have been separated more than is normal. A top arcuate retaining flap 18 is adhesively secured to the back wall 16. It can be seen that the top arcuate retaining flap 18 might in a separate embodiment be secured to the front wall 14. The edge of the arcuate top retaining flap is adapted to hold the record 12 from falling through the top of the sleeve 10. The phonograph record sleeve is made from a thick heavy cardboard and the edge of the arcuate flap is sufficient for this purpose. By utilizing cardboard for the sleeve, a separate record jacket is unnecessary, and advertising matter could be placed directly on the front of the sleeve.

The right side of the phonograph record sleeve 10 consists of a flap portion 29 adhesively secured to the front wall 14. A second flap portion 27 is integral with the flap portion 29 and folded over along fold line 37 so as to be wedged into place between the flap 29 and the back wall 16. An arcuate side flap 36 is cut out of the flap 27 and folded along line 40 so as to provide a side guide and retaining means for the record 12. This arcuate side flap 36 may be adhesively secured to the back wall 16.

The left side of the sleeve 10 is a mirror image of the right side.

A record 12 slipped into the sleeve 10 would be held in place at four points. The top of the record would abut the edge of the top arcuate retaining flap 18. The bottom of the record would abut the fold line 15 along the bottom of the sleeve 10. The left side of the record would be placed with its edge on the fold line 38. On opposite sides of the record would be the arcuate flap 34 and the side portion 23. These two pieces would hold the record securely in place. The right side of the sleeve 10 being the mirror image of the left side would similarly hold the right side of the record in place. The distance between the fold line 38 and its corresponding fold line on the right side of the sleeve would approximate the diameter of the record 12. The distance from the bottom 15 to the center of the edge of the top arcuate retaining flap 18 would also be equal to the diameter of the record 12.

Therefore, the record 12 would fit securely into place in the sleeve 10 with no room for side to side or up and down movement.

The cardboard blank out of which the record sleeve of the present invention is manufactured is shown in FIGURE 3. As can be seen, the blank consists of the front wall portion 14 connected through a fold line 15 to the back wall portion 16. On the side opposite the fold line 15 there is placed an arcuate tab portion 18 with perforated fold line 20 separating the arcuate tab portion 18 from the back wall 16. It is to be noted that the arcuate tab portion 18 does not extend the full length of the fold line 20 for reasons that will become obvious with respect to FIGURE 4.

Extending from the sides of the back wall 16 are left and right side flaps 22 and 24 respectively. The left side flap 22 is defined by a perforated fold line 26 separating it from the back wall 16. The right side flap 24 is defined by the perforated fold line 28 separating the flap 24 from the back wall 16.

The left side flap 22 consists of a back flap portion 23 and a front flap portion 25 separated by a fold line 30. The right flap 24 consists of a back portion 27 and a front flap portion 29. The front portion 29 and the back portion 27 are separated by a fold line 37. Partially cut out of the back flap portion 23 is an arcuate flap 34. The flap 34 is not cut along the fold line 38 as can be noted in FIGURE 2. The right back flap portion 27 has a similar partially cut out arcuate tab 36 attached to the flap portion 27 along fold line 40.

A pressure sensitive adhesive coating is placed along the arcuate flap 18. Additional pressure sensitive adhesive is placed along the edges 42 and 44 of the front wall 14.

FIGURE 4 shows the blank of FIGURE 3 partially folded. In this position, the arcuate tab 18 has been folded over against the back wall 16 and adhesively secured thereto. The back flap portion 23 has been folded along line 30 so as to be placed between the back wall 16 and the front flap portion 25.

The right back flap portion 27 has been folded along line 32 so as to be placed between the back wall 16 and the front flap portion 29. The arcuate tabs 34 and 36 are folded back along their fold lines 38 and 40 respectively.

From this position it is only necessary to fold over the front wall 14 along the fold line 15 to complete the phonograph record sleeve. In folding the front wall in place, the side adhesive portions 42 and 44 will adhere to the front wall portions 25 and 29 respectively.

The phonograph record sleeve is then ready for use.

The present invention may be embodied in other specific forms without departing from the spirit or essential attributes thereof and, accordingly, reference should be made to the appended claims, rather than to the foregoing specification as indicating the scope of the invention.

I claim:

1. A phonograph record sleeve comprising substantially rectangular cardboard front and back walls fixedly attached along three sides thereof to close said sides, two cardboard inserts fixedly secured to two parallel closed sides of said walls, said inserts including a tab portion, said tab portion having one edge attached to one of said walls, the other edges of said tab being unattached and extending inwardly toward the center of said walls, said tab portions define an arc of a circle with its center at the center of said walls, and said tab portion being fixedly attached at the center of the periphery of said arc.

2. The phonograph record sleeve of claim 1 included a third cardboard insert fixedly attached to one wall along the open side of said sleeve, the edge of said insert facing the opposed closed side of said sleeve being the arc of a circle having a diameter equal to the distance between said third insert edge and the closed side opposite the open side.

3. A cardboard blank for a phonograph record sleeve comprising substantially equal rectangular front and back wall portions separated along one edge by a first fold line, at least one of said walls having flap portions along opposite edges perpendicular to said first fold line, said flap portions being mirror images of each other, said flap portions being divided into at least two longitudinal portions along second fold lines parallel to said opposite edges, one of said longitudinal portions being adapted to be adhesively secured to one of said walls, the other longitudinal portion having a tab partially cut out therefrom along said second fold line and attached along one edge to said other longitudinal portion.

4. The cardboard blank of claim 3 wherein said tabs are centrally located with respect to the opposite edges of said wall, said tabs being cut out from said other longitudinal portion along a line forming an arc of a circle, said line being interrupted at a point centrally of said arc.

References Cited in the file of this patent

UNITED STATES PATENTS

| | | |
|---|---|---|
| 2,219,526 | McLaren | Oct. 29, 1940 |
| 2,827,223 | Allison | Mar. 18, 1958 |
| 2,986,325 | Loderhose | May 30, 1961 |